INVENTOR.
Meyer Marks
BY John L. Niegreff
ATTORNEY

INVENTOR.
Meyer Marks
BY John L. Nieguffe
ATTORNEY

United States Patent Office 3,056,928
Patented Oct. 2, 1962

3,056,928
ELECTRONIC CIRCUIT

Meyer Marks, Clarendon Hills, Ill., assignor to Admiral Corporation, Chicago, Ill., a corporation of Delaware
Filed Nov. 6, 1959, Ser. No. 851,453
8 Claims. (Cl. 325—425)

This invention relates to improvements in signal translation systems and particularly in means for selectively varying the transfer characteristics thereof.

More particularly the invention relates to means for increasing the transfer characteristic of a signal translation system as a direct function of time in response to a received signal of preselected amplitude.

In one of the specific embodiments chosen to illustrate the invention, the signal translation system is used with a transmitter arranged to generate an inherently damped ultrasonic signal for initiating the control unit. Because of the relatively weak signal emitted by the transmitter, and the distance between it and the control unit, it is necessary to employ an amplifier of high sensitivity in the control unit, at least for the desired signal frequency. On the other hand, as the transmitter is portable, it may often be operated close to the microphone or pickup on the control unit and consequently means must also be provided to prevent the resultant strong signal from overloading the amplifier.

It is conventional to use a high sensitivity amplifier under control of a fast acting amplitude function automatic gain control in signal translation systems of this type. The high sensitivity of the amplifier tends to make the control unit susceptible to noise impulses. The present invention concerns itself with improving the noise immunity of the control unit.

Generally, random noise comprises many frequencies of differing amplitudes having varying, but on the whole, relatively short durations. Obviously, the particular noise with which the invention is concerned is that portion included within the frequency band or spectrum of the control unit. As the control unit is designed to respond only to a signal of a particular frequency which has a predetermined minimum amplitude for a predetermined minimum time, noise immunity can be increased by taking advantage of these known characteristics of the control signal.

The invention achieves enhanced noise immunity by reducing the standby sensitivity of at least a part of the signal translation channel to all signals and by progressively increasing the sensitivity only in response to a signal of preselected characteristics. This is accomplished by what will be termed "inverse automatic gain control." The meaning of the term is apparent since conventional automatic gain control is understood in the art to involve means for reducing the sensitivity of a signal translation channel to all signals having an amplitude in excess of a predetermined minimum. The term inverse indicates that the opposite effect is obtained. Therefore, with inverse AGC the sensitivity of the signal translation channel is increased responsive to decay of the received signal. As mentioned previously, since noise signals are generally of very short duration, and since the control unit is designed to respond only to particular signals which have a predetermined duty cycle, that is, which persist at a certain fixed minimum amplitude for a determined minimum amount of time, that a substantial number of closely spaced noise pulses of a particular frequency would be required to activate the control unit.

While the present invention is particularly suited to transient or damped ultrasonic signals, it is obvious that it may also be used with other types of signals having different shapes of envelope.

Another object of this invention is to provide means for improving the noise immunity of any frequency selective circuit.

Still another object of this invention is to provide a frequency selective control unit of improved noise immunity in which the sensitivity of the unit is increased in response to signals of a particular frequency only.

A further object of this invention is to provide a control unit of low standby sensitivity in which the sensitivity is progressively increased as a function of the amplitude and duration of the received signal.

A still further object of this invention is to provide an ultrasonic remote control system of improved noise immunity.

A feature of this invention is incorporated in circuitry for producing "inverse automatic gain control" voltage to vary the transfer characteristic of the signal translation system in the presence of signals of a particular frequency.

Another feature of this invention is included in circuitry for increasing the sensitivity of the control unit in response to signals of one frequency and for decreasing the sensitivity of the control unit in response to signals of other frequencies.

Still another feature of this invention is directed toward achieving improved noise immunity in ultrasonic control systems using damped control signals and includes circuitry for increasing the sensitivity of the control unit in proportion to the signal decay rate.

Other objects and features of this invention will be apparent upon reading the specification in conjunction with the drawings in which.

Figure 1:
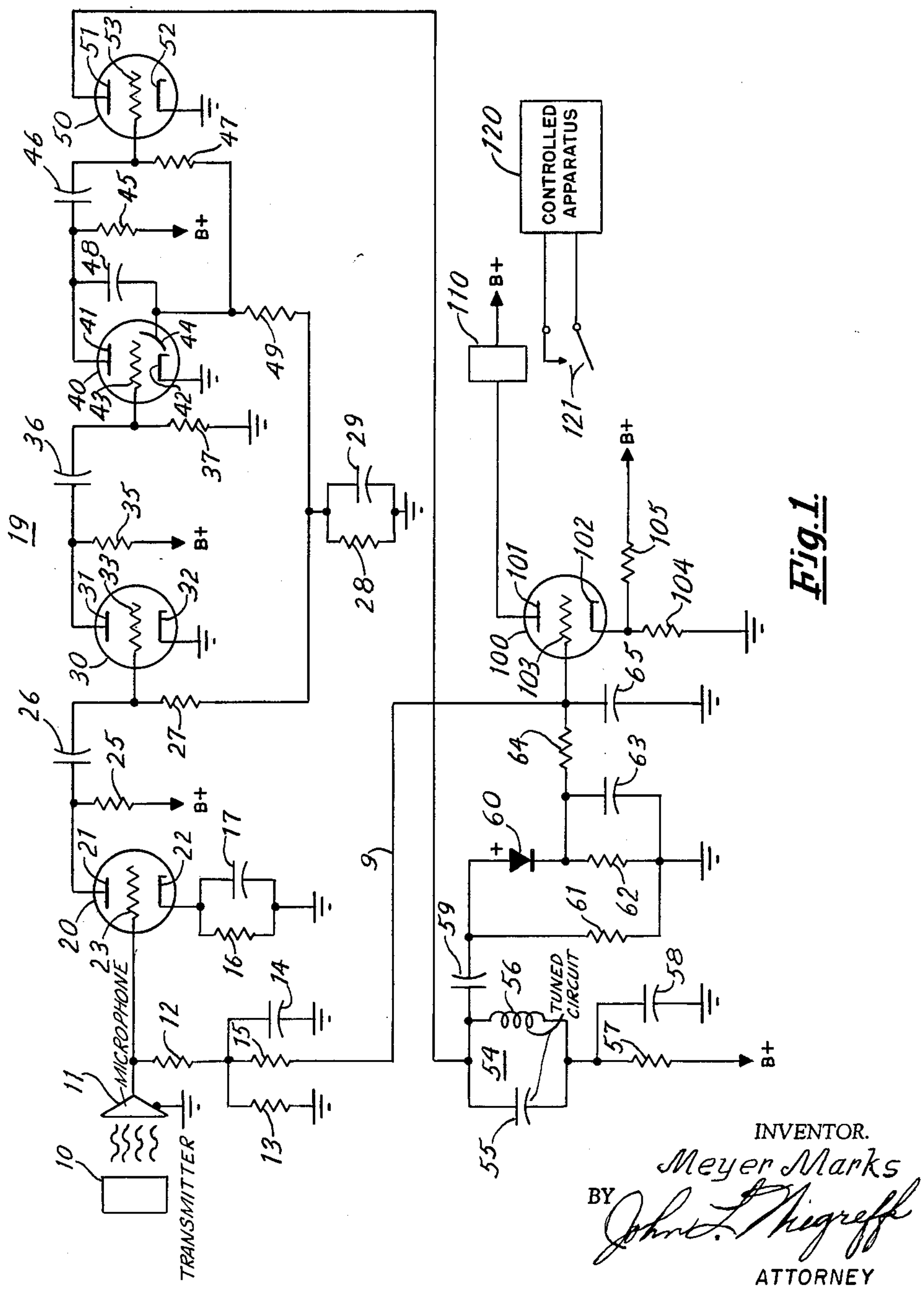
FIG. 1 represents in schematic form a control system incorporating one form of the invention.

The embodiment chosen for the purpose of illustrating the invention is shown in schematic form in FIG. 1. This figure represents a control system comprising an ultrasonic transmitter 10, and a control unit including a microphone 11, amplifying means 19, discriminating means 54, a relay control tube 100 and a control relay 110. Amplifying means 19 comprises amplifier tubes 20 to 50, inclusive. Microphone 11 is connected to grid 23 of amplifier tube 20. Grid 23 is also connected to ground through resistor 12 and the parallel combination of resistor 13 and capacitor 14. Cathode 22 of tube 20 is elevated from ground potential by the parallel combination of resistor 16 and capacitor 17. Plate 21 is connected through a resistor 25 to a positive source of potential B+. It will be noted that cathode 22 is biased by the direct current potential developed across resistor 16 as a result of the quiescent current flow between plate 21 and cathode 22 of tube 20. Capacitor 17 provides a by-pass to ground for signal voltages appearing across resistor 16.

The amplified signal voltages in the output of tube 20 are coupled to grid 33 of tube 30 through coupling capacitor 26. Grid 33 is biased by resistor 27, which is in series with the parallel combination of resistor 28 and capacitor 29. Cathode 32 is grounded and plate 31 is connected through a resistor 35 to B+. Signals in the output of tube 30 are similarly coupled to grid 43 of tube 40 through coupling capacitor 36, these signal voltages appearing across grid resistor 37.

Signal voltages impressed upon grid 43 cause corresponding changes in the current flowing from cathode 42 to plate 41, which is connected to B+ through resistor 45. A novel coupling circuit is used between tubes 40 and 50 for preventing excessive current flow in the plate circuit of tube 50 and in discriminating means 54. This novel coupling arrangement is fully disclosed in a co-pending application of the inventor Serial No. 817,410, filed June 1, 1959.

While this coupling arrangement is not a part of the present invention it may be well to digress for a moment to explain its use herein. In the prior art it was conventional to use a limiter in this portion of the circuit to prevent overloading of the discriminator in the presence of very large signals. However a limiter draws a fairly large amount of current over half of the input signal cycle and it was found that due to this the discriminator would sometimes shift in frequency. It should be understood of course that this invention may incorporate a limiter in the place of tube 50 or for that matter in the place of any of the other amplifying tubes in the circuit. However, in the preferred embodiment of the invention, the limiter will not be used. As is fully disclosed in the co-pending application above mentioned the coupling circuit between tubes 40 and 50 materially decreases the output current flowing in tube 50 thus preventing saturation of coil 56 in discriminating means 54 and the resultant shift in frequency.

Briefly capacitor 48 has a relatively short charge time since diode plate 44 and cathode 42 act as a rectifier. For positive signal excursions conduction occurs from plate 44 to cathode 42 and capacitor 48 charges. For negative signal excursions the rectifying action of plate 44 and cathode 42 terminates and capacitor 48 has a relatively long discharge time constant since resistors 49 and 28 are now placed in series with it. Hence the potential at the top of resistor 49 is negative in accordance with the signal strength. This potential is applied through resistor 47 to grid 53 of tube 50 thus setting a high bias level for this tube. Capacitor 46 couples the signal to grid 53. As can be seen from the drawing, the discharge time of capacitor 46 is necessarily longer than the discharge time of capacitor 48 since capacitor 46 has an additional resistor 47 in its discharge path. Also, since resistors 49 and 28 are common in the discharge circuits of both capacitors, capacitor 46 will necessarily lag capacitor 48 in discharging. Hence the bias on tube 50 is continuously adjusted in accordance with the variation of the signal peaks in such a manner as to prevent, under normal conditions, full conduction in the plate circuit of tube 50.

It will be noted that the negative potential developed across resistor 28 and parallelly connected capacitor 29 is fed back to the input circuit of tube 30. This arrangement will be recognized as one for supplying a conventional automatic gain control voltage to prevent overload of amplifying means 19 in the presence of very large signals. Thus the conventional automatic gain control circuit protects amplifying means 19 from effects of extremely large signals and the novel coupling network between tubes 40 and 50 does away with the large amounts of plate current normally associated with tubes operated as limiters.

Discriminating means 54, comprising the tuned parallel combination of capacitor 55 and inductor 56, is connected between plate 51 of tube 50 and by-pass capacitor 58. B+ for plate 51 is supplied through resistor 57 which is connected to the junction of the tuned circuit and by-pass capacitor 58. This circuit should be understood to be tuned to the frequency of the control signal of transmitter 10. Noise of other frequencies does not therefore develop appreciable voltage across the tuned circuit.

The tuned circuit is connected through a coupling capacitor 59 to the positive terminal of a rectifier 60 and to a D.C. return resistor 61. The negative terminal of rectifier 60 is connected to a resistor 62, a by-pass capacitor 63 and a resistor 64. The other terminal of D.C. return resistor 61, grounded resistor 62, and by-pass capacitor 63 is connected to ground. Resistor 64 is part of an integrating network consisting of resistor 64 and capacitor 65. The junction of these two components is connected to control grid 103 of relay tube 100 and, over a lead 9, to a resistor 15. The other terminal of resistor 15 is connected to the junction of resistors 12 and 13 in the grid circuit of tube 20.

Cathode 102 of relay tube 100 is "force biased" by virtue of its being connected to the junction of a pair of resistors 104 and 105 which form a voltage divider network between B+ and ground. Thus cathode 102 is maintained positive with respect to grid 103 due to the voltage drop across resistor 104. Plate 101 of relay tube 100 receives its B+ voltage through the winding of a control relay 110. Contacts 121 of relay 110 are shown connected to a block 120 labelled Controlled Apparatus.

Amplifying tube 20 is initially biased to reduce its sensitivity by approximately seventy-five percent. Assume that a control signal is transmitted by transmitter 10. In the preferred form of this apparatus the control signal will be damped and have a predetermined minimum duty cycle, that is, it will have a predetermined minimum amplitude for a predetermined minimum duration. Microphone 11 receives the transmitted signal and couples it to tube 20 where it is amplified. Thereafter it is further amplified in a well known manner in tubes 30 to 50 and appears across the tuned circuit in discriminating means 54. It will be recalled that the tuned circuit comprising capacitor 55 and inductor 56 is tuned to the frequency of this control signal, and consequently the control signal develops a substantial voltage across the tuned circuit.

The signal voltage is coupled by capacitor 59 to rectifier 60 where it is rectified. The action of the rectifier develops a positive voltage across resistor 62 and capacitor 63 which voltage begins charging capacitor 65 in the integrating network. The junction of capacitor 65 and resistor 64 therefore builds up a positive potential which is simultaneously applied to grid 103 of relay tube 100 and through resistor 15, to the junction of resistors 12 and 13 in the grid circuit of tube 20. This "inverse automatic gain control voltage" applied to grid 23 of tube 20 progressively restores the sensitivity of tube 20 in accordance with the voltage developed on capacitor 65. The circuit constants are so chosen that, in response to a minimum control signal, that is the weakest signal to which the control unit is designed to respond, the sensitivity of tube 20 will be raised to design maximum by the time the voltage across capacitor 65 renders tube 100 sufficiently conductive to allow relay 110 to operate.

Assume now that noise signals having frequencies different from the control signal frequency are received by microphone 11. After amplification in amplifying means 19 the noise signals are coupled to discriminating means 54. The voltage developed across the tuned circuit in discriminating means 54 is insufficient to allow capacitor 65 to charge and the sensitivity of tube 20 is not increased. This is obvious since only noise impulses of the proper frequency, that is the frequency to which the tuned circuit comprising capacitor 55 and inductor 56 is tuned, will develop appreciable voltage. It is apparent that to adversely affect the control unit, noise impulses at the control signal frequency must be of greater amplitude and duration than would be required in the case of a similar control unit without the invention. Yet, since the circuit is designed to take advantage of the known amplitude and duration characteristics of the control signal, overall sensitivity to control signals is not degraded. Thus, incorporation of the invention in this circuit has the noteworthy effect of increasing the noise immunity of the system while maintaining the signal sensitivity substantially as it was before the application of the invention.

It is apparent that this invention is particularly adapted to take advantage of our previous information concerning the control signal characteristics. As the control signal in this embodiment is inherently damped, the constants of the circuit are chosen to increase the sensitivity of amplifier tube 20 approximately in proportion to the decay rate of the minimum signal to which the control unit is to respond. It should be apparent that, with minor changes in circuit constants and conventional AGC level, the invention may be employed with equal facility with control signals that are not damped.

Figures 2, 3:
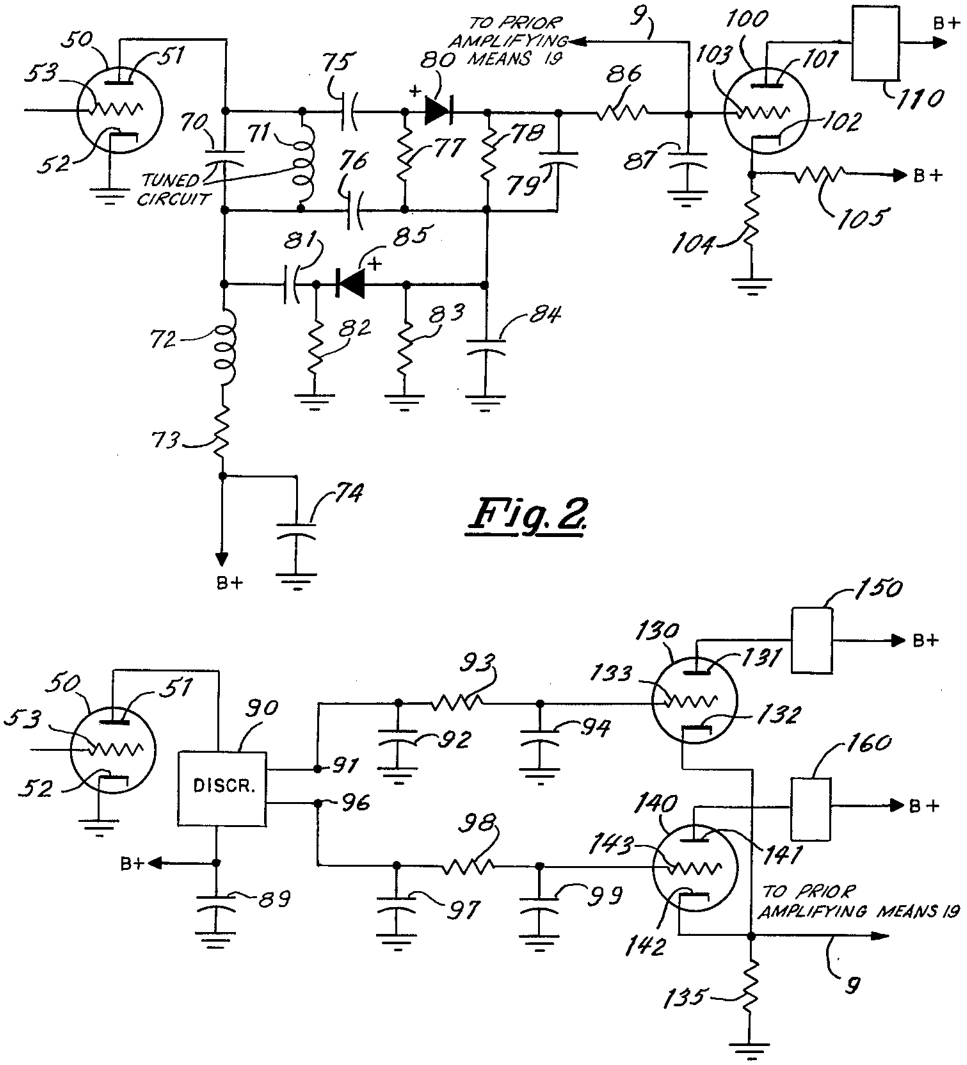
FIG. 2 shows a modification of the invention shown in FIG. 1.
FIG. 3 is a modification of a portion of the circuitry of FIG. 1 indicating the manner in which the invention may be used in a control unit designed to respond to more than one control signal.

In FIG. 2 there is shown a modified discriminator and associated circuitry for further enhancing the noise inhibition of the control unit. Parallelly connected capacitor 70 and inductor 71 are sharply tuned to the control signal frequency whereas serially connected inductor 72 and resistor 73 are broadly tuned to a band of frequencies within which the control signal frequency lies. Assume that a noise signal having a frequency slightly above or below the control signal frequency has been amplified and appears in the output circuit of tube 50. This noise signal develops very little voltage across the sharply tuned circuit comprising capacitor 70 and inductor 71 but does develop some voltage across serially connected inductor 72 and resistor 73. This noise voltage is coupled through capacitor 81 to the negative side of a rectifier 85, the positive side of which is connected to ground through parallelly connected resistor 83 and capacitor 84. Rectifier 85 is thus poled to develop a negative voltage across capacitor 84 in response to noise signals. The junction of capacitor 81 and rectifier 85 is connected to ground through a D.C. return resistor 82. The parallel combination of resistor 83 and capacitor 84 are connected through a resistor 78 to the junction of diode 80 and a resistor 86, which junction is normally at ground potential. In the presence of a noise signal or noise signals this junction is driven negatively and capacitor 87 in the integrating network charges. The negative voltage developed across capacitor 87 not only inhibits the operation of control relay 110 (by increasing the negative bias on tube 100) but it is also fed back (via lead 9) to one of the previous amplifying stages, in this case to further decrease its sensitivity.

For signals of the control signal frequency, a fairly large potential is developed across the sharply tuned circuit comprising capacitor 70 and inductor 71. This voltage is coupled to a D.C. return resistor 77 by a pair of coupling capacitors 75 and 76. One terminal of resistor 77 is connected to the positive side of a rectifier 80 and the other terminal is connected to the junction of resistor 83 and capacitor 84. The negative terminal of rectifier 80 is connected to the aforementioned junction of resistor 78 and 86. A capacitor 79 is connected in parallel with resistor 78. The other terminal of resistor 77, resistor 78 and capacitor 79 is connected to the positive side of rectifier 85.

Responsive to signal voltage across capacitor 70 and inductor 71, rectifier 80 functions to drive the upper terminal of resistor 78 in a positive direction. Capacitor 87 in the integrating network charges in the positive voltage direction to drive tube 100 more conductive and, via lead 9, increases the sensitivity of the amplifying stage to which it is connected (not shown in this figure) as described previously. It is apparent that voltage developed across resistor 78 and voltage developed across resistor 83 will be of opposite polarity and therefore tend to offset each other. Consequently, in the presence of a control signal and a fair amount of noise signals, both these resistors will have voltages developed across them. Of course, it should be noted that since inductor 72 and resistor 73 are broadly tuned, that a substantial amount of noise will be required to develop a voltage approximating the normal signal voltage developed across sharply tuned capacitor 70 and inductor 71. Thus, in the presence of both noise and signal, whether or not relay tube 100 will be driven sufficiently conductive to allow relay 110 to operate will depend upon the relative values of the signal and the noise, for a given setting of the conventional AGC circuit.

In FIG. 3 there is shown a modification of another portion of the circuitry of FIG. 1 for illustrating how the invention can be used in a multi-function remote control system. Transmitter 10 (not shown) is arranged to transmit a control signal of different frequency for each control relay to be energized. In the circuit of FIG. 3 a two function control system with two control relays (150, 160) is shown. The output of amplifier tube 50 is connected to a block 90 labelled Disc which incorporates a discriminator of the type which is tuned midway between the two control frequencies. Discriminator 90 is shown having two outputs 91 and 96 which should be understood to be at a negative potential in the absence of any signals. Responsive to the lower control frequency, output 91, for example, will swing in the positive voltage direction and correspondingly, responsive to the higher control frequency, output 96 will swing in the positive voltage direction. Relay tubes 130 and 140 have their respective cathodes 132 and 142 connected to ground through a common cathode resistor 135. The junction of these cathodes is also connected to lead 9, which is returned to one of the previous amplifier grids (not shown). Since normally the outputs 91 and 96 of discriminator 90 are held at a negative potential, grids 133 and 143 are likewise held at a negative potential.

Assume that the lower frequency control signal of transmitter 10 is transmitted. The circuitry preceding amplifier tube 50 receives and amplifies this signal which then appears across discriminator 90. Terminal 91 of discriminator 90 swings in a positive voltage direction in response to the signal and capacitor 94 in the integrating network charges, driving grid 133 in a positive direction. The current flowing between plate 131 and cathode 132 in tube 130 increases in accordance with the voltage on grid 133 and the potential across common cathode resistor 135 rises correspondingly. This potential is transferred over lead 9 to one of the prior amplifier stages and acts to progressively increase its sensitivity.

Similarly, responsive to the transmission of the higher frequency control signal of transmitter 10, output 96 of discriminator 90 swings in the positive voltage direction and capacitor 99 charges driving grid 143 in the positive direction. Tube 140 now draws more current and again the potential across common cathode resistor 135 increases. This potential is fed back to the aforesaid amplifying stage via lead 9 and thus the sensitivity of this stage is increased responsive to receipt of either of the two control signals. It will of course be obvious that additional functions may be provided in a similar manner as that shown and described. It will also be obvious that the noise inhibition feature disclosed in FIG. 2 may also be readily adapted to a multi-function control system.

It should be apparent to those skilled in the art that, as indicated in the descriptions of FIGS. 2 and 3, the inverse automatic gain control potential appearing on lead 9 may be applied to any of the prior stages. It is considered a mere matter of skill to adjust the operating characteristics of any of these amplification stages to facilitate application of the inverse automatic gain control voltage. It is also contemplated that physically separate amplifiers may be arranged in cascade and that the inverse automatic gain control voltage may be applied to either or both of these amplifiers as the particular situation dictates.

As mentioned previously the essence of the invention does not reside in any particular configuration of the amplifying means. Therefore it should be obvious to anyone skilled in the art that the conventional AGC arrangement used to prevent overload of the system may readily be replaced by an equally conventional limiter stage. Preferably the limiter stage would be positioned between the amplifying means and the discriminator. This type circuitry is deemed so well known in the art that it is not considered necessary to illustrate it in the drawings.

The invention has been described in an environment of a control system and particularly in an environment in an ultrasonically actuated control system. It will be understood however that the invention is not to be limited to this environment but will readily find application in any number of environments in which frequency selective circuits are incorporated. It will also be understood that the particular amplifier, discriminator, and conventional AGC arrangements shown are not to be considered limiting in any way. For example it will be readily apparent that the "inverse AGC" voltage may be applied to any one or more of the amplifier tubes shown. Also, it will be obvious that while the "inverse AGC" voltage has been brought back to the grid element of the amplifier tube, it may be readily applied with simple changes to the cathode or other tube electrode. It is also contemplated that multi-grid tubes may be used in which the "inverse AGC" voltage is applied to one grid and the conventional AGC voltage applied to the other grid.

It will also be apparent that if a limiter stage is used, it may be placed in any convenient position in the amplifying chain and need not be limited to the position mentioned above. It will also be readily apparent to anyone skilled in the art that semiconductor means may be employed rather than electron tubes as shown. While the particular arrangements disclosed are considered to be the preferred embodiments of the invention the invention should not be considered limited thereto but is only limited by the scope of the appended claims.

What is claimed is:

1. A control system responsive to ultra-sonic signals of particular frequency and predetermined minimum duty cycles comprising; means for receiving said signals; amplifying means coupled to said receiving means; utilization means; discriminating means having an input circuit coupled to said amplifying means and an output circuit coupled to said utilization means, said discriminating means energizing said output circuit only in response to a signal of substantially said particular frequency; said output circuit including output means for energizing said utilization means in response to a signal having said predetermined minimum duty cycle; limiting means in said amplifyng means for determining the maximum signal output level of sad amplifying means; desensitizing means for setting the minimum level of input signal necessary to produce output; and further means coupled to said output means for overriding said desensitizing means and decreasing the minimum signal level required by said amplifying means as a function of the duty cycles of all said signals having an initial amplitude exceeding said minimum level.

2. In combination; a high sensitivity signal translation channel having a signal receiving input circuit and an output circuit; means for producing signals of particular frequency at said input circuit; circuit means in said translation channel for normally maintaining said translation channel relatively insensitive to signals appearing at said input; further means in said translation channel for developing a potential responsive to receipt of a signal of said particular frequency and having a predetermined minimum initial amplitude; a connection between said further means and said circuit means for applying said developed potential to said circuit means whereby the sensitivity of said translation channel is restored only in the presence of a signal of said particular frequency and decaying amplitude.

3. In combination; a signal translation channel including an input circuit and an output circuit and having a predetermined frequency pass band; means for applying a signal of a particular frequency lying within said pass band to said input circuit, said applied signal being generally characterized by a constant frequency and an amplitude decaying from an initial value, said initial value being in excess of a predetermined value; first means in said translation channel for normally maintaining the sensitivity of said translation channel at a relatively low level whereby signals below said predetermined value are not translated; second means in said translation channel responsive to an input signal of said particular frequency, which has an initial amplitude above said predetermined value, for developing a potential in accordance with the amplitude and duration of said input signal; third means for applying said developed potential to said output circuit; and fourth means for applying said developed potential to said first means for progressively restoring the sensitivity of said translation channel only in the presence of said particular frequency input signal whereupon subsequent portions of said signal, of amplitude less than said predetermined value, are translated.

4. In combination in a control system; signal translation means having an input and an output, said signal translation means being capable of translating signals lying within a fixed frequency band; inhibiting means in said translation means for reducing its translation capability for all said signals; control signal means for producing a control signal of decreasing amplitude and predetermined minimum initial amplitude and duty cycle and having a constant frequency lying within said fixed frequency band at said input; and feedback means responsive only to said constant frequency interconnecting said output with said inhibiting means for restoring the translation capabilities of said translation means as the amplitude of the received signal decreases whereby subsequent signal amplitudes which are substantially less than said predetermined minimum initial amplitude are translated.

5. In a control system responsive to a control signal of a particular frequency and having an initial amplitude greater than a predetermined value and a minimum duty cycle; amplifying means capable of high sensitivity, but normally maintained relatively insensitive, for amplifying said control signal; said amplifying means being normally maintained insensitive with respect to all signals having amplitudes below a minimum value; utilization means; discriminating means having an input circuit coupled to said amplifying means and an output circuit coupled to said utilization means, said discriminating means energizing said output circuit only in response to signals of said particular frequency; said output circuit including output means for operating said utilization means only in response to signals having said minimum duty cycle; and feedback means coupled between said output means and said amplifying means for restoring the sensitivity of said amplifying means responsive to receipt of signals of said particular frequency, minimum duty cycle and having an initial amplitude greater than said predetermined value, whereby subsequent signal amplitudes below said predetermined value are amplified.

6. In a control system responsive to a control signal of predetermined frequency and having an initial amplitude in excess of a predetermined value and a decay characteristic such that a substantial portion of said signal has an amplitude less than said predetermined value; signal translation means capable of high sensitivity; means for maintaining the sensitivity of said signal translation means at a point such that said translation means are insensitive to any signals having amplitudes less than said predetermined value; and means coupled to said translation means responsive only to a control signal of said predetermined frequency and predetermined initial amplitude being translated thereby for increasing the sensitivity thereof whereby subsequent portions of said control signal having amplitudes below said predetermined value are translated.

7. In a control system responsive to a control signal of a particular frequency and having an initial amplitude greater than a predetermined value and a minimum duty cycle; amplifying means capable of high sensitivity for amplifying said control signal; said amplifying means being normally maintained insensitive with respect to all signals having amplitudes below a minimum value; utilization means; discriminating means having an input circuit coupled to said amplifying means and an output circuit coupled to said utilization means; first means in said discriminating means for developing a first polarity potential only in response to signals of said particular frequency; second means in said discriminating means for developing a second polarity potential in response to signals of other frequencies, said first means and said second means being arranged such that said potentials interact to produce a net potential; said output circuit including output means coupled between said discriminating means and said utilization means for energizing said utilization means only when said net potential is of said first polarity and is of a predetermined magnitude or greater for a predetermined duration; and feedback means coupled between said output means and said amplifying means for applying said net potential to said amplifying means, said net potential tending to restore the sensitivity of said amplifying means when it is of said first polarity and tending to further desensitize said amplifying means when it is of said second polarity.

8. In a control system selectively responsive to a group of control signals having different predetermined frequencies lying within a fixed frequency band and similar predetermined minimum duty cycles, said control signals having initial amplitudes greater than a predetermined value; a corresponding plurality of utilization means; amplifying means capable of high sensitivity, but normally maintained relatively insensitive for amplifying all signals within said fixed frequency band having initial amplitudes equal to or greater than said predetermined value; discriminating means having an input circuit coupled to said amplifying means and a plurality of output circuits individually coupled to respective ones of said plurality of utilization means, said discriminating means energizing a different one of said output circuits dependent upon the particular predetermined frequency of the received signal; said output circuits each including output means for operating said utilization means only in response to signals having said minimum duty cycle; and feedback means coupled betweeen said output means and said amplifying means for restoring the sensitivity of said amplifying means responsive to receipt of any of said control signals whereby subsequent portions of said signal having amplitudes below said predetermined value are amplified.

References Cited in the file of this patent

UNITED STATES PATENTS

| | | |
|---|---|---|
| Re. 19,857 | Farnham | Feb. 18, 1936 |
| 2,037,456 | Burnside | Jan. 27, 1934 |
| 2,653,226 | Mattingly | Sept. 22, 1953 |
| 2,817,025 | Adler | Dec. 17, 1957 |
| 2,830,177 | Taylor | Apr. 8, 1958 |
| 2,906,867 | Spiegel | Sept. 29, 1959 |
| 2,913,711 | Polyzon et al. | Nov. 17, 1959 |